United States Patent [19]
De Vos et al.

[11] Patent Number: 5,843,353
[45] Date of Patent: Dec. 1, 1998

[54] NON-PLANAR EVACUATED INSULATION PANELS AND A METHOD FOR MAKING SAME

[75] Inventors: Rik De Vos, Varese, Italy; Guy Leon Jean Ghislain Biesmans, Everberg, Belgium

[73] Assignee: Imperial Chemical Industries PLC, London, England

[21] Appl. No.: 619,778

[22] Filed: Mar. 20, 1996

[30] Foreign Application Priority Data

Apr. 13, 1995 [EP] European Pat. Off. ............ 95200934.8

[51] Int. Cl.$^6$ ...................................................... B32B 31/24
[52] U.S. Cl. ............................ 264/102; 156/257; 428/71; 428/69
[58] Field of Search .................... 428/69, 76, 71; 52/406.2, 309.9, 309.6, 788.1; 156/213, 214, 257; 264/101, 102, 279.1

[56] References Cited

U.S. PATENT DOCUMENTS

| | | | |
|---|---|---|---|
| 2,576,698 | 11/1951 | Russum | 52/406.2 |
| 3,557,840 | 1/1971 | Maybee et al. | 138/149 |
| 3,615,149 | 10/1971 | Malone et al. | 138/151 |
| 3,969,868 | 7/1976 | Bainter et al. | 52/622 |
| 4,576,206 | 3/1986 | Lauren | 138/149 |
| 4,668,555 | 5/1987 | Uekado et al. | 428/69 |
| 4,838,968 | 6/1989 | Nelson | 156/64 |
| 4,954,202 | 9/1990 | Price et al. | 156/353 |
| 5,310,594 | 5/1994 | Holland et al. | 428/176 |
| 5,457,138 | 10/1995 | Yuge et al. | 521/125 |

FOREIGN PATENT DOCUMENTS

| | | |
|---|---|---|
| 78608/87 | 3/1988 | Australia . |
| 0434225A1 | 6/1991 | European Pat. Off. . |
| 0437930A1 | 7/1991 | European Pat. Off. . |
| 0440031 | 8/1991 | European Pat. Off. . |
| 0498628A1 | 8/1992 | European Pat. Off. . |
| 0644036 | 3/1995 | European Pat. Off. . |
| 3628469A1 | 2/1988 | Germany . |
| 4230065A1 | 3/1994 | Germany . |
| 4311510A1 | 10/1994 | Germany . |
| 4324996C1 | 10/1994 | Germany . |
| 63-135694 | 6/1988 | Japan . |
| 7091594 | 4/1995 | Japan . |
| 7151297 | 6/1995 | Japan . |
| 7195385 | 8/1995 | Japan . |
| 7269778 | 10/1995 | Japan . |
| 2222791 | 3/1990 | United Kingdom . |
| 95/02620 | 1/1995 | WIPO . |

Primary Examiner—Alexander Thomas

[57] ABSTRACT

Non-planar integral evacuated insulation panels and a method for making these by providing grooves in the filler material prior to enveloping said filler and forming by evacuating, which method allows to make evacuated insulation panels of specific non-planar shapes depending on the depth and shape of the grooves.

10 Claims, 4 Drawing Sheets

NON-PLANAR EVACUATED INSULATION PANELS AND A METHOD FOR MAKING SAME

The present invention relates to non-planar evacuated insulation panels, a method for the production thereof, and their use for thermal insulation purposes.

Evacuated insulation panels and methods for their production are known.

Evacuated insulation panels having a reduced internal pressure are known for various uses including use in refrigeration appliances where they greatly enhance the degree of thermal insulation within the cabinet of the appliance.

Such evacuated insulation panels generally comprise a low thermal conductivity filler material and a vessel formed of a gastight film enveloping said filler, the whole being evacuated to an internal pressure of about 5 mbar or less and then hermetically sealed. Besides insulation the filler has also the function of supporting the skin of the vessel so that it does not collapse when it is evacuated.

Known filler materials for use in such evacuated insulation panels include finely divided inorganic powders such as fumed silica, silica dust, precipitated silica, precipitated silica/fly ash mixtures, alumina, fine perlite and fiberglass. It has also been proposed, in Japanese Patent Application Kokai No. 133870/82, to use organic foamed materials having open cells as the core maternal in evacuated insulation panels, for example, open celled rigid polyurethane foam (see European Patent Publications Nos 0498628 and 0188806).

Most of the known evacuated insulation panels are of a planar structure. However it has been found desirable to provide three-dimensional constructions of evacuated insulation panels (for example, bended or curved constructions) especially to cover corners and roundings in refrigerators such as in the compressor zone.

Methods hitherto disclosed to make three-dimensional constructions from evacuated canels consist of assemlbling, e.g. joining by way of an adhesive, pre-fabricaned flat panels in such a way that the desired shape is obtained (see e.g. European Patent Publication Nos 434225, 434226 and 437930 and German Patent Publication No. 4230065).

Folding of pre-fabricated flat panels has also been suggested. V-shaped grooves can be provided in the panels in order to make them foldable (see, for example, FR 2636255). In this way box-like constructions can be obtained. Prefabricated, V-shape grooved panels that can be folded in order to obtain a box-like construction and which can be provided between the housing walls of freezers or refrigerators have been described, for example, in DE 4311510.

However, in constructions consisting of assembled flat panels gaps occur, specifically at the edges, which give rise to substantial and undesirable local heat losses.

Furthermore, the known methods to make three-dimensional constructions of evacuated insulation panels involve a multitude of production steps which render the production of such panels complicated and time-consuming.

It would therefore be highly desirable to provide rigid, integral, non-planar evacuated insulation panels as well as an economical method for making such panels.

It has now surprisingly been found that shaped evacuated insulation panels can be made by providing the open celled foamed insulation material within said panels with grooves prior to evacuation and forming by evacuation.

Accordingly, the present invention relates to rigid non-planar integral evacuated insulation panels comprising an open celled insulating foam enveloped in a substantially gas impermeable flexible vessel.

Figure 1A:
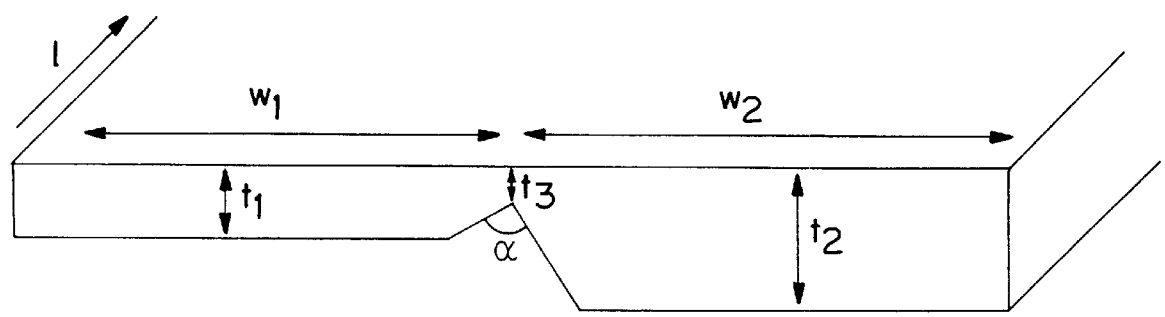
FIGS. 1a, 2a, 3a and 4a depict blocks of rigid polyurethane foam prepared in accordance with the present invention.
Figure 1B:
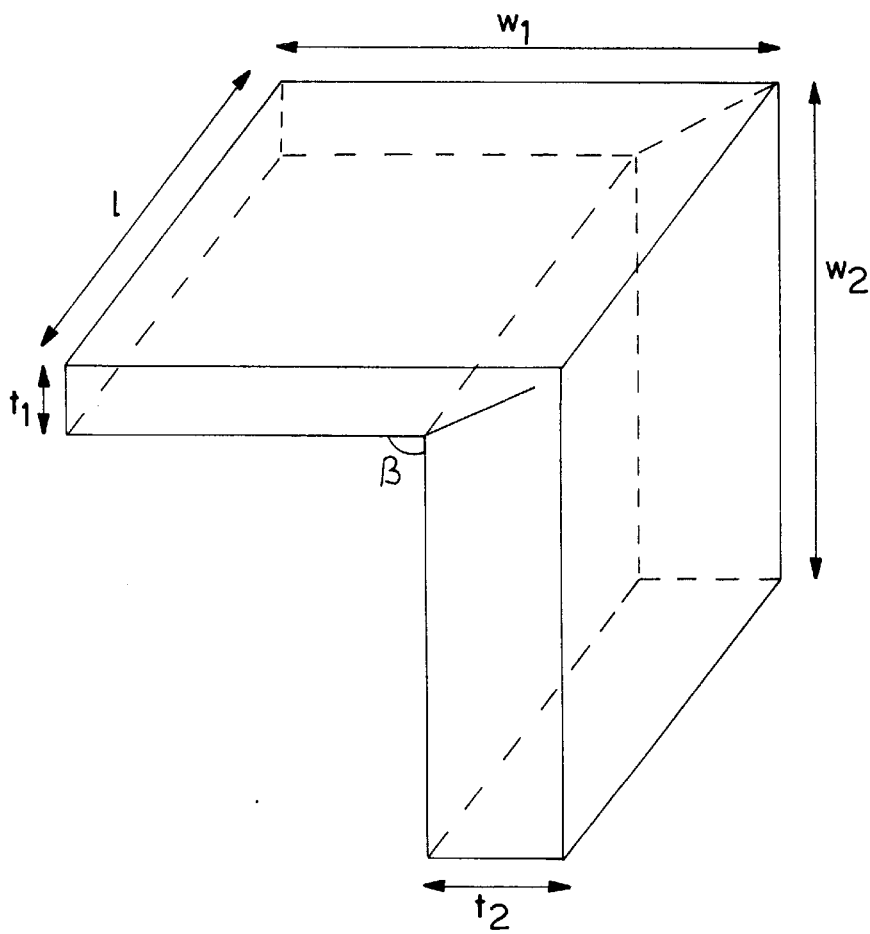
FIGS. 1b, 2b, 3b, and 4b depict evacuated insulation panels obtained from the blocks shown in FIGS. 1a, 2a, 3a and 4a, respectively.

Suitable insulating foams are open celled organic foamed materials.

The open celled organic foamed material to be used as insulating foam may be derived from the following materials: polyurethanes, polystyrenes, polyethylenes, acrylics, phenolics (such as phenol formaldehyde), halogenated polymers such as polyvinylchloride. In this invention most preference is given to open celled rigid polyurethane and urethane-modified polyisocyanurate foams.

Open celled rigid polyu-ethar.e and urethane-modified polyisocyanurate foams are in general prepared by reacting the appropriate organic polyisocyanate and polyfunctional isocyanate-reactive copcound in the presence of a cell-opening agent. Examples of formulations for making open celled rigid polyurethane foam are described in European patent publications nos 0498628, 0547515, 0188806 and in PCT patent publication no. 95/02620.

Suitable organic polyisocyanates for use in the preparation of open celled rigid polyurethane foams include any of those known in the art for the preparation of rigid polyurethane or urethane-modified polyisocyanurate foams, and in particular the aromatic polyisocyanates such as diphenylmethane diisocyanate in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, toluene diisocyanate in the form of its 2,4- and 2,6-isomers and mixtures thereof, 1,5-naphthalene diisocyanate and 1,4-diisocyanatobenzene. Other organic pcyisocyanates which may be mentioned include the aliphatic diisocyanates such as isophorone diisocyanate, 1,6-diisocyanatohexane and 4,4'-diisocyanatodicyclohexylmethane.

Polyfunctional isocyanate-reactive compositions for use in the preparation of open celled rigid polyurethane foams include any of those known in the art for the preparation of rigid polyurethane or urethane-modified polyisocyanurate foams. Of particular importance for the preparation of rigid foams are polyols and polyol mixtures having average hydroxyl numbers of from 300 to 1000, especially from 300 to 700 mg KOH/g, and hydroxyl functionalities of from 2 to 8, especially from 3 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolylene diamine, diaminodiphenylmethane and polymethylene polyphenylene polyamines; and aminoalcohols, for example ethanolamine and diethanolamine; and mixtures of such initiators. Other suitable polymeric polyols include polyesters obtained by the condensation of appropriate proportions of glycols and higher functionality polyols with dicarboxylic or polycarboxylic acids. Still further suitable polymeric polyols include hydroxyl terminated polythioethers, polyamides, polyesteramides, polycarbonates, polyacetals, polyolefins and polysiloxanes. The quantities of the polyisocyanate compositions and the polyfunctional isocyanate-reactive compositions to be reacted will depend upon the nature of the rigid polyurethane or urethane-modified polyisocyanurate foam to be produced and will be readily determined by those skilled in the art.

The preparation of open celled rigid polyurethane foam may be carried out in the presence of any of the blowing agents known in the art for the preparation of rigid polyurethane or urethane-modified polyisocyanurate foams. Such blowing agents include water or other carbon dioxide-evolving compounds, or inert low boiling compounds having a boiling point of above −70° C. at atmospheric pressure.

In order to reach low thermal conductivity levels at reduced pressure levels, open celled rigid polyurethane foams having decreased cell sizes (in the range 50 to 150 micron) have been used. These fine celled open celled rigid polyurethane foams can be obtained by incorporating an insoluble fluorinated compound into the foam-forming mixture.

The term insoluble as used herein with reference to the insoluble fluorinated compound to be used in the preparation of fine celled open celled rigid polyurethane foam is defined as showing a solubility in either the isocyanate-reactive composition or the polyisocyanate composition with which it is to be blended of less than 500 ppm by weight at 25° C. and atmospheric pressure.

Insoluble fluorinated compounds for use in the preparation of fine celled open celled rigid polyurethane foam include any of those disclosed in U.S. Pat. No. 4,981,879, U.S. Pat. No. 5,034,424, U.S. Pat. No. 4,972,002, European Patent Applications Nos 0508649 and 0498628 and in PCT patent publication no. 95/18176.

Suitable compounds include substantially fluorinated or perfluorinated hydrocarbons, substantially fluorinated orperfluorinated ethers, substantially fluorinated or perfluorinated tertiary amines, substantially fluorinated or perfluorinated amino-ethers and substantially fluorinated or perfluorinated sulphones.

The term substantially fluorinated as used herein with reference to the insoluble, substantially fluorinated compound to be used in the preparation of fine celled open celled rigid polyurethane foam is to be understood to embrace compounds in which at least 50% of the hydrogen atoms of the unfluorinated compounds are replaced by fluorine.

Suitable examples of substantially fluorinated or perfluorinated hydrocarbons are those containing from 1 to 15 carbon atoms, which may be either cyclic or acyclic, either aromatic or aliphatic and either saturated or unsaturated, such as substantially fluorinated and perfluorinated methane, ethane, propane, butane, pentane, hexane, heptane, octane, nonane, decane, cyclobutane, cyclooctane, cyclohexane, cyclopentane, cycloheptane, norbornadiene, decaline, dimethylcyclobutane, methylcyclohexane, 1-methyldecaline, phenanthrene, dimethylcyclobutane, and isomers thereof and perfluoro(cyclo)olefins such as hexafluoropropene dimers and trimers. Particular mention may be made of the various isomers of perflucropentane and perfluorohexane such as perfluoro-n-pentane and perfluoro-n-hexane and perfluoro(4-methylpent-2-ene).

Suitable examples of substantially fluorinated or perfluorinated ethers are those containing from 3 to 15 carbon atoms, which may be cyclic or acyclic, such as substantially fluorinated or perfluorinated dialkyl ethers and alkyl substituted cyclic ethers. Particular mention may be made of perfluorinated methyl ethyl ether, perfluorinated methyl propyl ether, the perfluorinated alkyltetrahydropyrans such as perfluorinated propyltetrahydropyran, and the perfluorinated alkyltetrahydrofurans such as perfluorinated propyltetrahydrofuran and perfluorinated butyltetrahydrofuran. Additional examples of substantially fluorinated or perfluorinated ethers which are suitable for use in the process of the invention are the commercially available fluorinated polyethers such as Galden HT 100, HT 200, HT 230, HT 250 and HT 270 from Montefluos SpA (Galden is a Trade Mark).

Suitable examples of substantially fluorinated or perfluorinated amines are tertiary amines containing from 3 to 15 carbon atoms, which may be cyclic or acyclic, such as substantially fluorinated or perfluorinated trialkylamines, N-alkylated cyclic amines, tetraalkylhydrazines and trialkylhydroxylamines. Particular mention may be made of substantially fluorinated or perfluorinated trimethylamine, triethylamine, ethyldimethylamine, methyldiethylamine, tripropylamine, tributylamine, tripentylamine, tetramethylhydrazine, trimethylhydroxylamine, O-ethyl dimethylhydroxylamine, O,O'-bis-(dialkylamino) propylene-glycol, O,O'-bis-(dialkylamino)ethyleneglycol, N-methylpyrrolidine and the N-alkylpiperidines such as N-methylpiperidine.

Suitable examples of substantially fluorinated or perfluorinated aminoethers include those having from 3 to 15 carbon atoms, which may be cyclic or acyclic, such as substantially fluorinated or perfluorinated trialkylethanolamines and N-alkylmorpholines. Particular mention may be made of substantially fluorinated or perfluorinated trimethylethanolamines and N-($C_{1-6}$ alkyl)morpholines such as N-methyl, N-ethyl and N-isopropylmorpholine.

Suitable examples of substantially fluorinated or perfluorinated sulphones include perfluorinated dialkylsulphones having from 2 to 8 carbon atoms such as perfluoro-(dimethylsulphone) and perfluoro-(methyldiethyl-sulphone).

Certain insoluble fluorinated compounds suitable for use in the preparation of fine celled open celled rigid polyurethane foam may themselves act as blowing agents under the conditions pertaining to the foam-forming reaction, particularly where their boiling point is lower than the exotherm temperature achieved by the reaction mixture. For the avoidance of doubt, such materials may, partly or completely, fulfil the function of blowing agent in addition to that of insoluble fluorinated compound.

The amount of the insoluble fluorinated compound to be used in the preparation of fine celled open celled rigid polyurethane foam ranges from 0.05 to 10%, preferably from 0.1 to 5%, most preferably from 0.6 to 2.3% by weight based on the total foam-forming composition.

The insoluble fluorinated compound will usually be incorporated in the foam-forming reaction mixture in the form of an emulsion or preferably a microemulsion in one of the major components, that is to say in the isocyanate-reactive component and/or the polyisocyanate component. Such emulsions or microemulsions may be prepared using conventional techniques and suitable emulsifying agents.

Emulsifying agents suitable for preparing stable emulsions or microemulsions of fluorinated liquid compounds in organic polyisocyanates and/or isocyanate-reactive compounds include surfactants chosen from the group of nonionic, ionic (anionic or cationic) and amphoteric surfactants. Preferred surfactants are fluoro surfactants, silicone surfactants and/or alkoxylated alkanes. Particular examples of fluoro surfactants include fluorinated alkyl polyoxyethylene ethanols, fluorinated alkyl alkoxylates and fluorinated alkyl esters. Examples of useful fluorinated surfactants which are commercially available are Fluorad FC 430 and FC 431 from 3M, Forafac 1110D, 1157, 1157N and 1199D from Atochem and Fluowet S 3690, OTN and CD from Hoechst.

The amount of emulsifying agent used is between 0.02 and 5 pbw per 100 pbw of foam forming reaction system and between 0.05 and 10 pbw per 100 pbw of polyisocyanate or polyol composition.

In addition to the polyisocyanate and polyfunctional isocyanate-reactive compositions, the insoluble fluorinated compound and the blowing agent, the foam-forming reaction mixture will commonly contain one or more other auxiliaries or additives conventional to formulations for the production of open celled rigid polyurethane and urethane-modified polyisocyanurate foams. Such optional additives include crosslinking agents, for examples low molecular weight polyols such as triethanolamine, foam-stabilising agents or surfactants, for example siloxane-oxyalkylene copolymers, urethane catalysts, for example tin compounds such as stannous octoate or dibutyltin dilaurate or tertiary amines such as dimethylcyclohexylamine or triethylene diamine, fire retardants, for example halogenated alkyl phosphates such as tris chloropropyl phosphate or alkyl phosphonates, and cell-opening agents such as polymer particles (such as polymer polyols), incompatible liquids such as solvents or polyols, inorganic fillers such as bentonite clays, silica particles (particularly fumed silica), metal flakes and stearates.

A particularly preferred process for the preparation of open celled fine celled rigid polyurethane or urethane-modified polyisocyanurate foam is described in EP 498628 and WO 95/02620 (both incorporated herein by reference) and comprises the step of reacting an organic polyisocyanate with an isocyanate-reactive material in the presence of a blowing promotor being an isocyanate-reactive cyclic compound of formula:

(I)

wherein
Y is O or NR$^1$ wherein each R$^1$ independently is a lower alkyl radical of C$_1$–C$_6$ or a lower alkyl radical substituted with an isocyanate-reactive group;
each R independently is hydrogen, a lower alkyl radical of C$_1$–C$_6$ or (CH$_2$)$_m$-X wherein X is an isocyanate-reactive group which is OH or NH$_2$ and m is 0, 1 or 2; and
n is 1 or 2;
with the proviso that at least one of R$^1$ or R is or comprises an isocyanate-reactive group;
and in the presence of an insoluble fluorinated compound and in the presence of a metal salt catalyst.

A preferred compound of formula (I) wherein Y is O is an isocyanate-reactive cyclic carbonate which is glycerol carbonate.

Preferred compounds of formula (I) wherein Y is NR$^1$ are isocyanate-reactive cyclic ureas of formula:

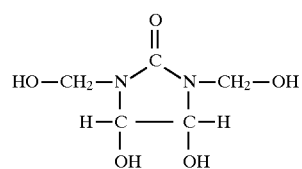

(II)

and

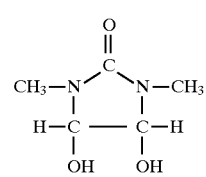

(III)

The isocyanate-reactive cyclic blowing promotor is used in amounts ranging from 0.1 to 99% preferably from 1 to 60% by weight based on the total isocyanate-reactive material.

Suitable further blowing agents may be used in the said preferred process of the present invention such as water or inert low boiling compounds having a boiling point of above −50° C. at 1 bar.

The amount of water used as blowing agent may be selected in known manner to provide foams of the desired density, typical amounts being in the range from 0.05 to 5 parts by weight per 100 parts by weight of reactive ingredients, although it may be a particular embodiment of the present invention to incorporate up to 10% by weight or even up to 20% by weight of water.

Suitable inert blowing agents include, for example, hydrocarbons, dialkyl ethers, alkyl alkanoates, aliphatic and cycloaliphatic hydrofluorocarbons, hydrochlorofluorocarbons, chlorofluorocarbons and fluorine-containing ethers. Suitable hydrocarbon blowing agents include lower aliphatic or cyclic hydrocarbons such as n-pentane, isopentane, cyclopentane, neopentane, hexane and cyclohexane.

Preferred metal salt catalysts are those selected among group Ia and group IIa metal salts, more preferably among group Ia and group IIa metal carboxylates.

Particularly suitable catalysts are potassium acetate and potassium ethylhexoate.

The metal salt catalyst is used in amounts ranging from 0.01 to 3% by weight based on the total reaction system.

Apart from the metal salt catalyst some amine catalyst may be used in this process.

In operating the process for making open celled rigid polyurethane foams, the known one-shot, prepolymer or semi-prepolymer techniques may be used together with conventional mixing methods and the rigid foam may be produced in the form of slabstock, mouldings, cavity fillings, sprayed foam, frothed foam or laminates with other materials such as hardboard, plasterboard, plastics, paper or metal.

To reduce the number of component streams delivered to the final mixing apparatus, most of the additives such as the blowing agent, catalyst, fluorinated compound and optionally others may be premixed with one of the major components of the foam formulation, in general with the isocyanate-reactive component.

Suitable enveloping vessels need to be highly impermeable for gases as the gas permeation rate of the vessel directly affects both the occurrence of heat leakage and thus the thermal insulation efficiency of the resulting evacuated insulation panel as well as the operating lifetime of the panel. Also, they should prevent transmission of heat by conduction or radiation, be easily sealable by heat sealing and flexible so that they can bend.

Materials suitable for the vessel include plastics such as polyester, polyvinylidene chloride, polypropylene and polyvinyl alcohol. Preferably the plastics film is vapor deposited with a metallic film or laminated with a metallic foil providing for higher protection against vacuum leak. The plastic film bag may also include a thermoplastic heat sealing layer consisting of a thermoplastic resin having a relatively low melting point (lower than 200° C.). Examples of suitable thermoplastics include polyolefins, such as low density polyethylenne, high density polyethylene and polypropylene, polyacrylonitrile, polyvinylidenechloride and copolymers thereof, and polyamide, such as nylon 11 and nylon 12, or a similar synthetic resin.

For the film deposited on or foil laminated with the plastics film metals can be used such as aluminum, titanium, lead, iron and alloys thereof or tin and its alloys, such as tin alloys with antimony, bismuth and copper or mixtures thereof. Preference is given to a laminate of a thin Al foil.

It is preferred to precondition the insulating filler material prior to placement in the gastight envelope. This preconditioning involves heating and optionally, agitating the filler material in order to remove contaminants from the surface of the filler. The removal of filler contaminants improves inter alia the expected panel life. Further the removal of contaminants reduces the time required to evacuated the vessel thereby reducing the time and cost associated with the manufacture of an evacuated insulation panel. Reduced pressures may also be used together with heating and/or agitation.

Generally it will be necessary to include a getter to remove residual gases or vapors that may still be present in the sealed panels or that permeate the enclosure from the outside atmosphere. Suitable materials for use as a getter are, for example, granulated calcium sulfate or microporous bariumoxide which is excellent in removing water vapor, activated carbon to remove organic gases, metals to absorb oxygen and nitrogen and zeolites to absorb carbon dioxide and nitrogen. Other known getters are described in U.S. Pat. Nos. 4,000,246; 4,444,821; 4,663,551; 4,702,963; 4,726,974 and in European Patent publication Nos. 434266 and 181778.

The non-planar evacuated insulation panels of the present invention are produced by enveloping an insulating foam in a substantially gas impermeable flexible vessel, evacuating the whole and sealing, wherein the insulating material is provided with at least one groove prior to evacuation.

The panels of the invention do not show any undesired deformation or any other surface defects. Furthermore, they have insulation properties equivalent to planar panels. However, when applied in e.g. refrigerators, energy consumption will be reduced due to the elimination of heat losses at the edges.

The present method involves cutting a flat panel of the insulating material having the desired thickness or thickness variations such that a surface area corresponding to the dimension of the ultimate construction is obtained and a two-dmensional shape such that the desired ultimate three-dimensional shape can be obtained upon bending.

One or more grooves having the required depth and shape are provided in the foam from end to end in a chosen direction and at the appropriate position and side so as to obtain the desired ultimate construction after evacuation. Dust arising from the grooving of the foam should be carefully removed. Subsequently, the insulating material is enveloped in a suitable manner as described hereinbefore, and the whole is evacuated.

The evacuation is conveniently carried out by use of a vacuum pump which is connected to the area to be evacuated. After the evacuation operation the pressure in the created vacuum should be about 10 mm Hg or less. Pressures as low as 1 mm Hg or even below 1 mm Hg are preferred. Upon evacuation the evacuated insulation panels take their final form.

The evacuated construction is finally sealed.

The interior angle between two parts of the bent panel is between 0° and 180°, suitably between 30° and 175°.

It has been found that the interior angle between the two parts of the bent panel is influenced by the thickness of the panel and the depth and shape of the groove. To a large extent however it will be determined by the angle of the groove. For a given panel thickness, groove shape and depth, the larger the groove angle the smaller the interior angle of the two parts becomes. For example a groove angle of 108° will usually provide a panel bended over 90°.

Generally, V-shaped grooves will be made, but U-shaped or rectangular grooves have also proven to be efficient. However, other shapes of grooves can be used as well.

The shaping of the panels does not influence the thermal conductivity properties. It is also surprising that even under the quite substantial forces to which the panels are subjected during shaping, the foam does not break.

Since a multitude of straight or curved grooves of multiple sizes, shapes and depths can be appplied on one or more sides of a flat panel, integral panels of any desired shape can be obtained by this invention. For example, U-, L-, Z- or S-shaped panels can be made by combining several grooves at the appropriate positions and sides. Multiple grooves can be used to get quasi-curved shaped panels. The use of curved grooving can result in spherical bending of the panel.

Refrigeration appliance is only a single example of a product that can utilise evacuated insulation panels. They can also form part of an insulated building panel. Other environments having a hot side and a cold side could also benefit from the use of the present invention.

The evacuated insulation panels can be easily arranged in the door and walls of a refrigerator. They are generally attached by adhesive to the walls of the thermal device to be insulated and then foamed-in-place with a liquid organic material such as polyurethane. The polyurethane foam then assists in holding the panels between the walls and also provides additional insulation.

Rectangular or cubic panels, for example, are particularly useful in the insulation of compressor zones in refrigerators or freezers. Cylindrical panels can be used, for example, as insulation means for boilers and heating pipes or tubes.

The various aspects of this invention are illustrated but not limited by the following examples.

EXAMPLE 1

Rigid open celled polyurethane foam was made according to the process described in European Patent Publication No. 0498628. Blocks of different sires were cut from the prepared foam and grooves were provided In these blocks as shown in FIGS. 1a to 3a. These foams were then enveloped in a gas impermeable flexible film and evacuated. Evacuated insulation panels of different sizes were obtained as shown in FIGS. 1b to 3b.

In FIG. 1:

$w_1=w_2=130$ mm $l=480$ mm $t_1=8$ mm $t_2$=15 mm
$t_3$=5 mm
$\alpha$=108°
$\beta$=90°

Figure 2A:
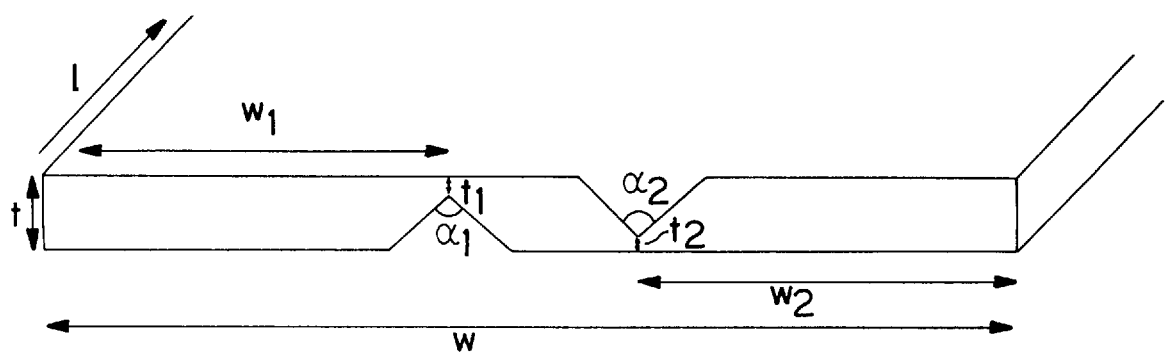
Figure 2B:
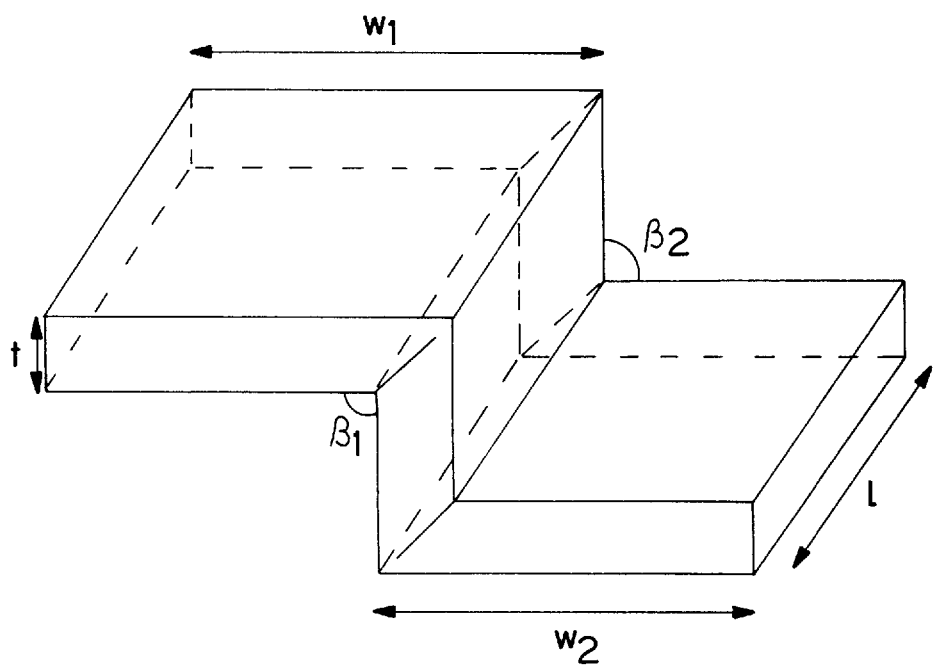
Figure 3A:
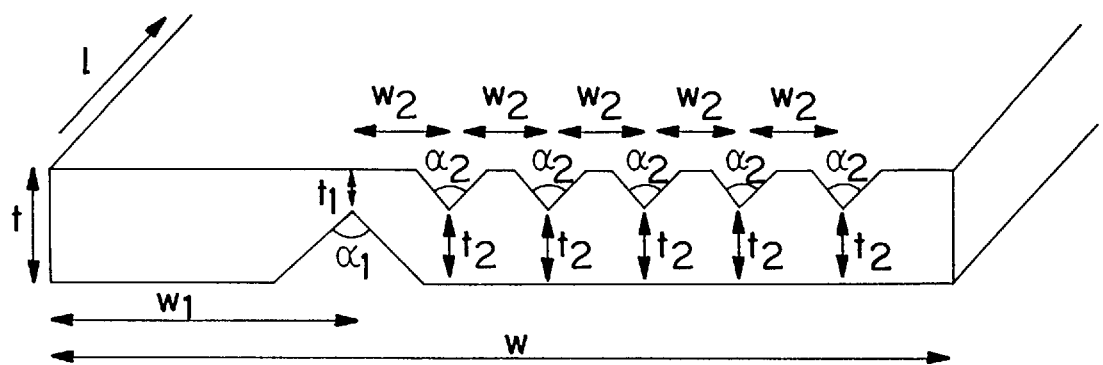
Figure 3B:
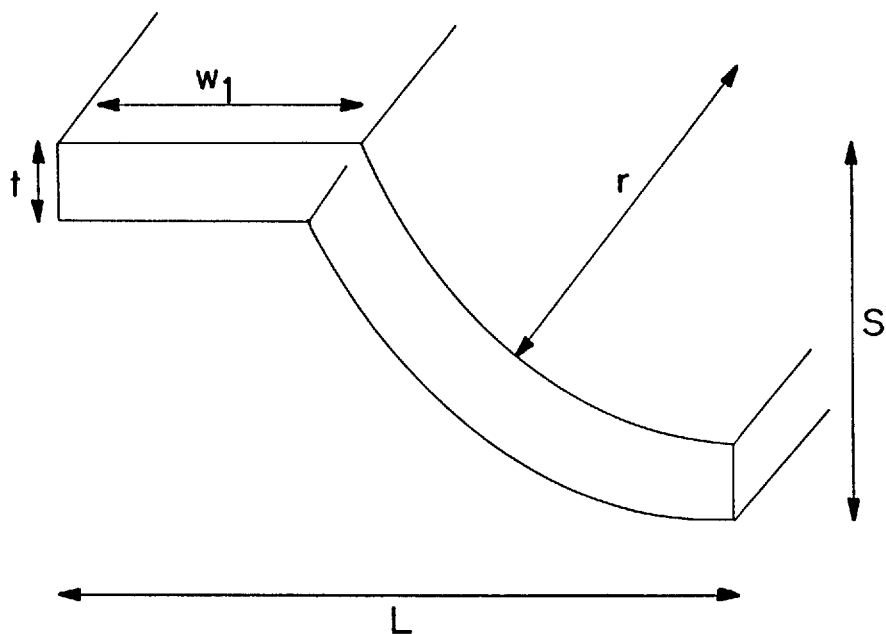

In FIG. 2:
w=640 mm
$w_1$=273 mm
$w_2$=260 mm
l=420 mm
t=20 mm
$t_1$=$t_2$=5 mm
$\alpha_1$=$\alpha_2$=108°
$\beta_1$=$\beta_2$=90°

In FIG. 3:
w=600 mm
$w_1$=200 mm
$w_2$=66 mm
l=240 mm
t=15 mm
$t_1$=5 mm
$t_2$=10 mm
$\alpha_1$=108°
$\alpha_2$=90°
r=250 mm
s=260 mm
z=460 mm

EXAMPLE 2

Figure 4A:
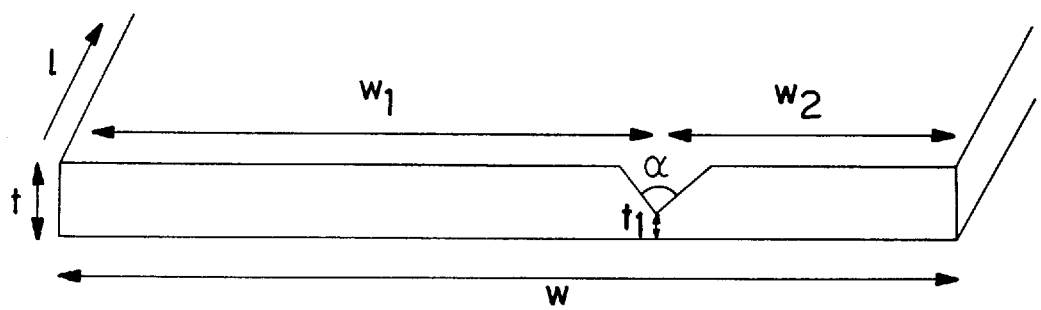
Figure 4B:
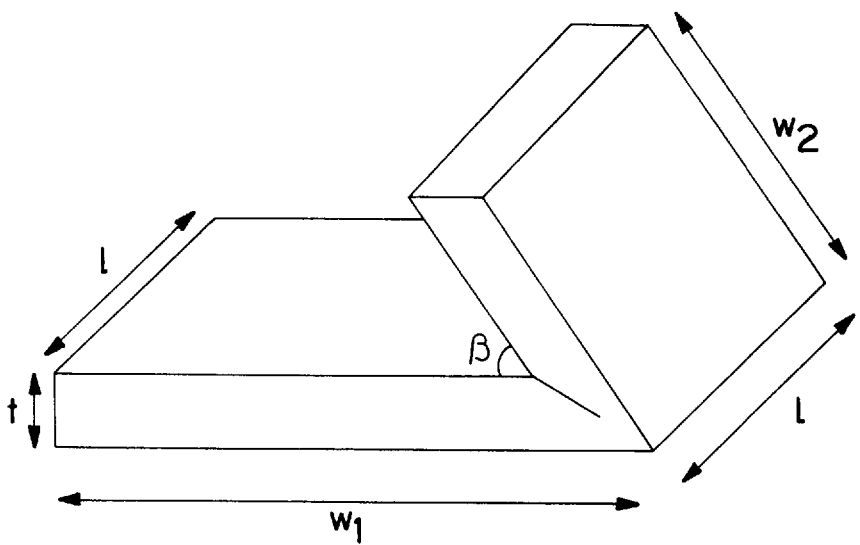

Rigid open celled polyurethane foam was made according to the process described in European Patent Publication No. 0498628. Two blocks of size 40×20×2 cm were cut from the prepared foam. In one block a groove was provided as shown in FIG. 4a (w=400 mm, $w_1$=300 mm, $w_2$=100 mm, t=20 mm, $t_1$=5 mm, l=200 mm, $\alpha$=90°). Both blocks of foam after heat treatment were enveloped in a gas impermeable film thin Al layer provided on one side with PET and on the other side with a polyethylene heat sealing layer), evacuated and sealed. A getter had been provided within the panel. The grooved block bended and a panel of the shape as shown in FIG. 4b resulted ($\beta$=45°). The thermal conductivity of both of the obtained panels was measured according to standard ISO 2581, initially and after 7 and 14 days. The results are presented in Table 1.

TABLE 1

|  |  | Flat panel | Bended panel |
|---|---|---|---|
| Lambda initial | mW/mK | 7.4 | 7.2 |
| Lambda after 7 days | mW/mK | 7.4 | 7.5 |
| Lambda after 14 days | mW/mK | 7.4 | 7.3 |

These results show that the bending of the panels does not detrimentally affect the thermal insulation properties of the panels.

We claim:

1. Method for producing a non-planar rigid integral evacuated insulation panel comprising an insulating foam enveloped in a substantially gas impermeable flexible vessel by enveloping a flat panel of insulating foam in the substantially gas impermeable flexible vessel, evacuating the enveloped insulation foam and sealing, characterised in that at least one groove is provided in the insulating foam prior to evacuation.

2. Method according to claim 1 wherein the substantially gas impermeable vessel comprises a multilayer flexible barrier film.

3. Method according to claim 1 wherein the insulating foam comprises an open celled rigid polyurethane or urethane-modified polyisocyanurate foam.

4. Method according to claim 3 wherein said open celled rigid polyurethane or urethane-modified polyisocyanurate is prepared by reacting an organic polyisocyanate composition with a polyfunctional isocyanate-reactive composition in the presence of a blowing promoter which is an isocyanate-reactive cyclic compound of formula

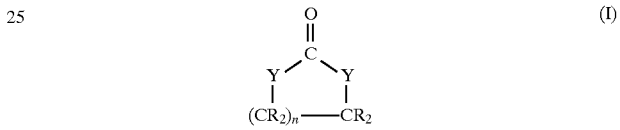

wherein

Y is O or $NR^1$ wherein each $R^1$ independently is a lower alkyl radical of $C_1$–$C_6$ or a lower alkyl radical substituted with an isocyanate-reactive group;

each R independently is hydrogen, a lower alkyl radical of $C_1$–$C_6$ or $(CH_2)_m$-X wherein X is an isocyanate-reactive group which is OH or $NH_2$ and m is 0, 1 or 2; and n is 1 or 2, with the proviso that at least one of the $R^1$ or R is or comprises an isocyanate-reactive group; and in the presence of an insoluble fluorinated compound and a metal salt catalyst.

5. Method according to claim 1 wherein a panel is produced of which the interior angle between the two parts of the non-planar panel is between 30° and 175°.

6. Method according to claim 1 wherein said panel has a shape selected from the group consisting of cylindrical, rectangular, L-, Z-, U- and S-shape.

7. Method according to claim 1 wherein a multitude of grooves is provided in the foam.

8. Method according to claim 7 wherein said grooves are provided on both sides of the foam.

9. Method according to claim 7 wherein different types of grooves are provided in the foam.

10. Method according to claim 7 wherein V-shaped grooves are provided in the foam.

* * * * *